(12) United States Patent
Turner et al.

(10) Patent No.: US 11,024,185 B2
(45) Date of Patent: Jun. 1, 2021

(54) APPARATUS AND METHOD FOR ASSISTING FLIGHT CREW DURING AN APPROACH TO AN AIRPORT WITH RESTRICTIONS FOR NON-STANDARD CONDITIONS

(71) Applicant: HONEYWELL INTERNATIONAL INC., Morris Plains, NJ (US)

(72) Inventors: Nathan Shaughn Turner, Phoenix, AZ (US); Sivakumar Kanagarajan, TamilNadu (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/013,099

(22) Filed: Jun. 20, 2018

(65) Prior Publication Data
US 2019/0392718 A1    Dec. 26, 2019

(51) Int. Cl.
*G05D 1/00* (2006.01)
*G05D 1/04* (2006.01)
(Continued)

(52) U.S. Cl.
CPC .......... *G08G 5/025* (2013.01); *G08G 5/0013* (2013.01); *G08G 5/0021* (2013.01)

(58) Field of Classification Search
None
See application file for complete search history.

(56) References Cited

U.S. PATENT DOCUMENTS 6,263,263 B1 *    7/2001    Shehi ................. G01C 5/005
                                                                   340/601
8,200,378 B1      6/2012    Chiew et al.
(Continued)

OTHER PUBLICATIONS

Notices to Airmen Publication—Cold Temperature Restricted Airports, Dec. 11, 2014, accessed on Jul. 17, 217 provided by//http://code7700.com/pdfs/cold_temperature_restricted_airports_ntap_2014-12-11.pdf (Year: 2014).*
(Continued)

*Primary Examiner* — Adam D Tissot
*Assistant Examiner* — Laura E Linhardt
(74) *Attorney, Agent, or Firm* — Bookoff McAndrews, PLLC

(57) ABSTRACT

A method for assisting pilots during an approach to an airport with a cold temperature restriction which includes: programming on a computing device, at least one processor to implement an algorithm of an app to automatically detect a temperature restriction of a particular airport with the cold temperature restriction and to calculate a cold temperature compensation based on data from published notices to airman (NOTAMs) and to generate data of a corrected altitude of the aircraft during an approach to the cold temperature restricted airport based on a first component of sensor data contributed from the current flight approach and based on a second component of data of NOTAMs; receiving sensor data to the at least one processor deployed on the aircraft; an associated memory for acquiring the published data; and executing an algorithm to calculate a corrected cold temperature altitude when approaching the airport with the cold weather restriction.

20 Claims, 9 Drawing Sheets

(51) Int. Cl.
*G01C 25/00* (2006.01)
*G08G 5/02* (2006.01)
*G01C 5/06* (2006.01)
*G08G 5/00* (2006.01)

(56) References Cited

U.S. PATENT DOCUMENTS

| | | | | |
|---|---|---|---|---|
| 8,723,686 | B1* | 5/2014 | Murray | G08G 5/0039 |
| | | | | 340/901 |
| 2006/0247828 | A1* | 11/2006 | Ardila | G01C 23/00 |
| | | | | 701/3 |
| 2008/0243316 | A1* | 10/2008 | Sacle | G01C 25/00 |
| | | | | 701/9 |
| 2013/0304285 | A1 | 11/2013 | Dumoulin et al. | |
| 2018/0251230 | A1* | 9/2018 | Chavez | G01C 23/005 |
| 2019/0108760 | A1* | 4/2019 | Krishna | B64D 43/00 |

OTHER PUBLICATIONS

Direct-to; Honeywell FMS Quarterly Update and Newsletter; Aug. 2010.
Anonymous, Cold Temperature Restricted Airports, Aug. 17, 2017, Retrieved from the Internet: URL: https://www.faa.gov/air_traffic/publications/atpubs/ntap_feb_18/part4_GEN17000.html.

* cited by examiner

| Aerodrome Temperature (°C) | Height Above the Elevation of the Altimeter Setting Source (Meters) | | | | | | | | | | | | | | | |
|---|---|---|---|---|---|---|---|---|---|---|---|---|---|---|---|---|
| | 60 | 90 | 120 | 150 | 180 | 210 | 240 | 270 | 300 | 450 | 600 | 900 | 1200 | 1500 |
| 0 | 5 | 5 | 10 | 10 | 10 | 15 | 15 | 15 | 20 | 25 | 35 | 50 | 70 | 85 |
| -10 | 10 | 10 | 15 | 15 | 25 | 20 | 25 | 30 | 30 | 45 | 60 | 90 | 120 | 150 |
| -20 | 10 | 15 | 20 | 25 | 25 | 30 | 35 | 40 | 45 | 65 | 85 | 130 | 170 | 215 |
| -30 | 15 | 20 | 25 | 30 | 35 | 40 | 45 | 55 | 60 | 85 | 115 | 170 | 230 | 285 |
| -40 | 15 | 25 | 30 | 40 | 45 | 50 | 60 | 65 | 75 | 110 | 145 | 220 | 290 | 365 |
| -50 | 20 | 30 | 40 | 45 | 55 | 65 | 75 | 80 | 90 | 135 | 180 | 270 | 360 | 450 |

FIG. 7A

| Aerodrome Temperature (°C) | Height Above the Elevation of the Altimeter Setting Source (Feet) ← 720 | | | | | | | | | | | | | | | |
|---|---|---|---|---|---|---|---|---|---|---|---|---|---|---|---|---|
| | 200 | 300 | 400 | 500 | 600 | 700 | 800 | 900 | 1000 | 1500 | 2000 | 3000 | 4000 | 5000 | | |
| 0 | 20 | 20 | 30 | 30 | 40 | 40 | 50 | 50 | 60 | 90 | 120 | 170 | 230 | 280 | | |
| -10 | 20 | 30 | 40 | 50 | 60 | 80 | 80 | 90 | 100 | 150 | 200 | 290 | 390 | 490 | | |
| -20 | 30 | 50 | 60 | 70 | 90 | 100 | 120 | 130 | 140 | 210 | 280 | 420 | 570 | 710 | | |
| -30 | 40 | 60 | 80 | 100 | 120 | 140 | 150 | 170 | 190 | 280 | 380 | 570 | 760 | 950 | | |
| -40 | 50 | 80 | 100 | 120 | 150 | 170 | 190 | 220 | 240 | 360 | 480 | 720 | 970 | 1210 | | |
| -50 | 60 | 90 | 120 | 150 | 180 | 210 | 240 | 270 | 300 | 450 | 590 | 890 | 1190 | 1500 | | |

FIG. 7B

APPARATUS AND METHOD FOR ASSISTING FLIGHT CREW DURING AN APPROACH TO AN AIRPORT WITH RESTRICTIONS FOR NON-STANDARD CONDITIONS

TECHNICAL FIELD

Embodiments of the subject matter described herein relate generally to assisting with an approach of an aircraft to an airport with restrictions for non-standard conditions, and more particularly, embodiments of the subject matter relate to an apparatus and method for making corrections when approaching a cold temperature restricted airport.

BACKGROUND

Routinely, pilots make corrections during approach phase of the flight to adjust for non-standard conditions, particularly when there are differences in international standard atmospheres (ISAs) during the approach of the aircraft. The crew of the aircraft upon an approach reports the cold temperatures corrected altitudes for flying to the cold temperature restricted airports or, in the alternate, the traffic personnel at the airports with cold temperature restrictions reports the cold temperature corrected altitudes to the aerodrome controllers in order for the flight crew to apply a cold temperature correction. The crew may apply a temperature correction on either an intermediate segment or as a result of a published missed approach final altitude which is part of the crew's adherence to a standard operating procedure followed by operating convention. The communication reports generally occur by radio contact (RT) with the air traffic controllers (ATCs) who issue the approach clearance. The ATC, as part of its operating procedures, requires the reporting of this information during an approach by either party.

The flight crew must take care to not apply the cold temperature compensation to an ATC assigned altitude or when flying on radar vectors in lieu of a published missed approach procedure flight path. The flight crew is instructed to query ATC when vectors to an intermediate segment are lower than the requested intermediate segment altitude corrected for temperature. In addition, the flight crew is encouraged to self-announce corrected altitude when flying into uncontrolled airfields to adhere to safe landing procedures.

Accordingly, it is desirable to improve the state awareness in real-time of the flight crew during an approach of an aircraft by publishing and presenting to the flight crew corrected altitudes of cold temperature and weather restrictions at destination airports. In addition, it is desirable to determine by a cold weather assistance system by the use of an algorithmic solution to ascertain an amount necessary to correct altitudes at cold temperature restricted airports presented by the flight crew and also in use in conjunction with presenting corrected altitudes in a terminal area procedure application to the flight crew. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide an apparatus and method for determining an amount of correction of an altitude of aircraft when approaching a destination airport with cold temperature weather restriction.

In one embodiment, an apparatus for assisting a pilot during an approach of an aircraft to an airport with a cold temperature restriction is provided. The apparatus includes: at least one processor deployed on a computing device, the at least one processor being programmed to automatically detect a temperature restriction of the airport with the cold temperature restriction and to calculate a cold temperature compensation based on data from published notices to airman (NOTAMs) by implementing an algorithm of an app hosted by the computing device to generate data of a corrected altitude of the aircraft during an approach to the cold temperature restricted airport based on a first component of sensor data contributed from a current flight approach and based on a second component of data of the NOTAMs wherein the first and second components are used to determine the corrected altitude of the cold temperature compensation for the approach; the at least one processor having an input coupled to receive sensor data from at least one sensor system deployed on the aircraft; the at least one processor having an associated memory for acquiring published data automatically of restricted airports; the at least one processor being programmed to execute an algorithm which calculates a corrected cold temperature altitude for a particular segment when approaching the airport with the cold temperature restriction; the at least one processor being configured to communicate with an air traffic control for clearance for a corrected altitude for a particular flight segment on approach; and the at least one processor being configured to display alerts to the pilot about when not to apply the corrected altitude during the approach to the cold temperature restricted airport.

In various embodiments, an apparatus is provided that includes: the at least one processor to notify the pilot when vectors to an intermediate segment of a flight path are lower than a requested intermediate segment altitude as a result of a correction for a cold temperature. The apparatus further includes: the at least one processor being configured to alert the pilot, in instances, when to apply the corrected altitude during the approach to the airport. The at least one sensor system generates temperature data of temperatures about the aircraft during the approach. The apparatus further includes: the at least one processor communicating, by the pilot to the air traffic control, a corrected altitude for a particular flight segment on approach and an amount of correction necessary to achieve for the particular flight segment when approaching the airport with the cold temperature restriction. The apparatus further includes: the at least one processor programmed to identify by using the app whether the airport of a particular destination of a list of airports has a cold temperature restriction. The apparatus further includes: the at least one processor being programmed to generate caution messages to the pilot when vectors to an intermediate segment are lower than a requested intermediate segment altitude corrected for temperature.

In another embodiment, a method for assisting a pilot during an approach pf an aircraft to an airport with a cold temperature restriction is provided. The method includes: A method for assisting a pilot during an approach of an aircraft to an airport with a cold temperature restriction, the method comprising: programming on a computing device, at least one processor to implement an algorithm of an app hosted by the computing device to automatically detect a temperature restriction of a particular airport with the cold temperature restriction and to calculate a cold temperature compensation based on data from published notices to airman (NOTAMs) and to generate data of a corrected altitude of the aircraft during an approach to the cold temperature restricted airport based on a first component of sensor data contributed from a flight approach and based on a second component of data of the NOTAMs wherein the first and second components are used to determine the corrected altitude of the cold temperature compensation for the approach; receiving sensor data to the at least one processor from at least one sensor system deployed on the aircraft; associating a memory to the at least one processor for acquiring published data automatically of restricted airports; executing by the at least one processor an algorithm which calculates a corrected cold temperature altitude for a particular segment when approaching the airport with the cold temperature restriction; communicating by communication devices coupled to the at least one processor with an air traffic control for clearance for a corrected altitude for a particular flight segment on approach; and displaying alerts, by the at least one processor, to the pilot about when not to apply the corrected altitude during the approach to the cold temperature restricted airport.

In various embodiments, the method includes: notifying the pilot when vectors to an intermediate segment of the flight path are lower than a requested intermediate segment altitude as a result of a correction for a cold temperature. The method further includes: alerting the pilot, in instances, when to apply the corrected altitude during the approach to the airport. The at least one sensor system generates temperature data of temperatures about the aircraft during the approach. The method further includes: communicating, by the pilot to the air traffic control, a corrected altitude for a particular flight segment on approach and an amount of correction necessary to achieve for the particular flight segment when approaching the airport with the cold temperature restriction. The method further includes: sharing, by the communication devices, the corrected altitude to another aircraft wherein the another aircraft is connected via a communication network enabled to share flight data. The method further includes: generating caution messages to the pilot when vectors to an intermediate segment are lower than a requested intermediate segment altitude corrected for temperature.

In a final embodiment, a method for performing a set of instructions contained on a non-transitory computer-readable medium executed by a processor is provided. The method includes: programming on a computing device, at least one processor to implement an algorithm of an app hosted by the computing device to automatically detect a temperature restriction of a particular airport with the cold temperature restriction and to calculate a cold temperature compensation based on data from published notices to airman (NOTAMs) and to generate data of a corrected altitude of the aircraft during an approach to the cold temperature restricted airport based on a first component of sensor data contributed from a flight approach and based on a second component of data of the NOTAMs wherein the first and second components are used to determine the corrected altitude of the cold temperature compensation for the approach; receiving sensor data to the at least one processor from at least one sensor system deployed on the aircraft; associating a memory to the at least one processor for acquiring published data automatically of restricted airports; executing by the at least one processor an algorithm which calculates a corrected cold temperature altitude for a particular segment when approaching the airport with the cold temperature restriction; communicating by communication devices coupled to the at least one processor with an air traffic control for clearance for a corrected altitude for a particular flight segment on approach; and displaying alerts, by the at least one processor, to a pilot about when not to apply the corrected altitude during the approach to the cold temperature restricted airport.

In various embodiments, the method includes: notifying the pilot when vectors to an intermediate segment of the flight path are lower than a requested intermediate segment altitude as a result of a correction for a cold temperature. The method further includes: alerting the pilot, in instances, when to apply the corrected altitude during the approach to the airport. The at least one sensor system generates temperature data of temperatures about the aircraft during the approach. The method further includes: communicating, by the pilot to the air traffic control, a corrected altitude for the particular flight segment on approach and an amount of correction necessary to achieve for the particular flight segment when approaching the airport with the cold temperature restriction. The method further includes: identifying by using the app whether the airport of a particular destination of a list of airports has a cold temperature restriction. The method further includes: generating caution messages to the pilot when vectors to an intermediate segment are lower than a requested intermediate segment altitude corrected for temperature.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 7A and 7B illustrate tables of values for corrected altitudes used by the cold temperature assistance system in accordance with various exemplary embodiments;

DETAILED DESCRIPTION

Figure 1:
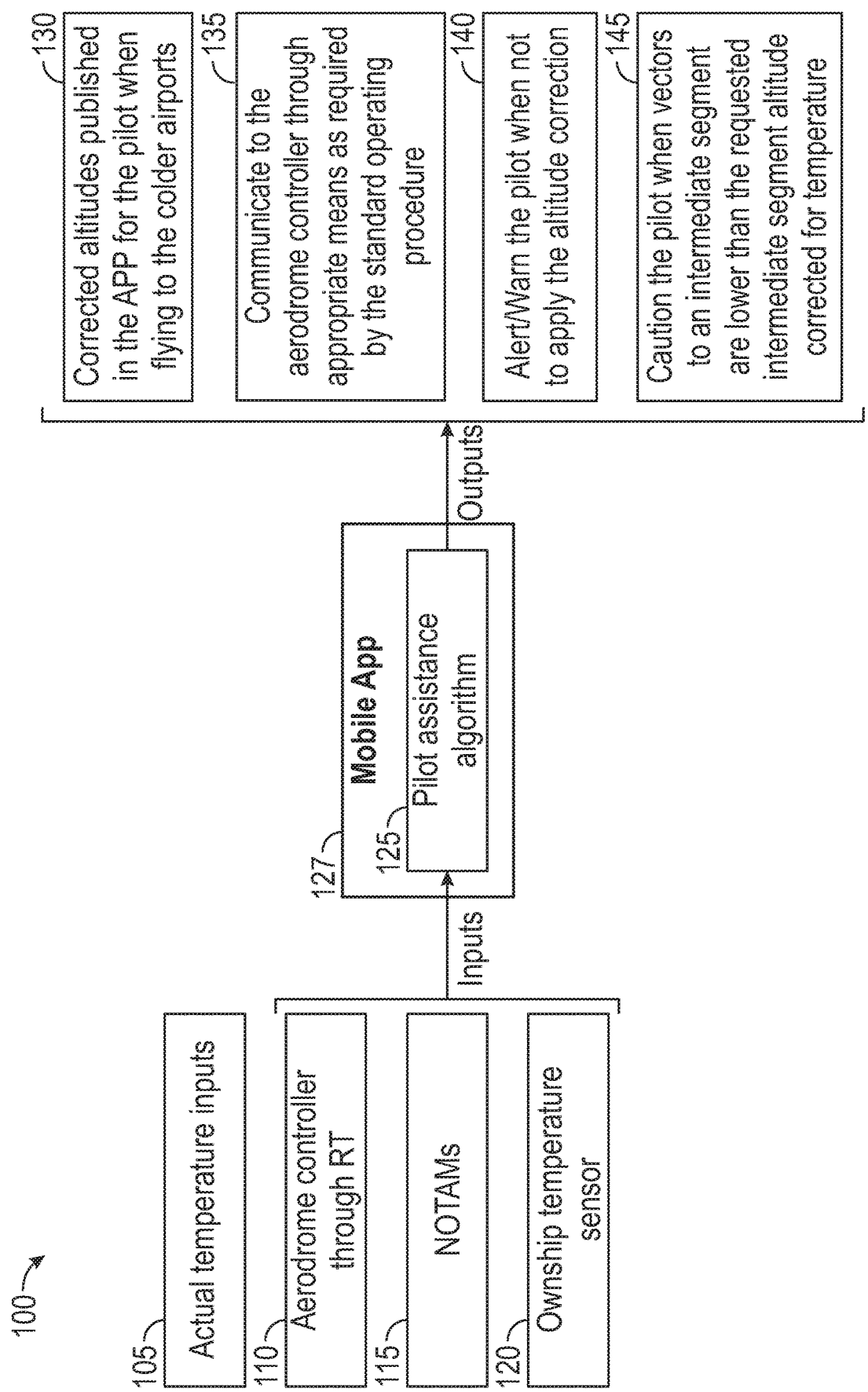
FIG. 1 illustrates a block diagram of implementing a cold temperature assistance system for flight crew assistance when approaching a restricted cold temperature airport in accordance with various exemplary embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In response to recognized safety concerns over cold weather altimetry errors, the Federal Aviation Administration (FAA) determined by various risk analyses if the current regulations (i.e. Title 14 of the Code of Federal Regulations Part 97 instrument approach procedures in the United States National Airspace System) pose a greater risk during cold temperature operations. The outcome of this risk assessment has led the FAA to publish a Notices to Airmen Publication (NTAP) providing pilots with a list of airports as well as affected segments and procedures that need correct published altitudes when restricted temperature conditions are put into place.

In accordance with the NTAP regulations, pilots must understand that the need and the responsibility for applying altitude corrections and must also advise Air Traffic Control (ATC) when these corrections are to be made on any segment other than the final segment. ATC is not always responsible for making any altitude corrections and/or advising pilots that an altitude correction is required at a cold temperature restricted airport, this onerous, in general, falls on the pilot.

Hence, it is desirable to alleviate pilot responsibilities by providing an apparatus and method that provides an automated methodology for presenting published cold weather temperatures, at appropriate times, to the pilot during the course of a flight and in particular at destinations with cold temperature restrictions.

The present disclosure describes a cold temperature assistance system that, in part, publishes the corrected altitudes when flying to destinations of airports with restrictions for conditions of cold temperature or when the destination airport is determined to be at a colder temperature. The corrected altitudes and the amount of correction are presented to the flight crew based on outputs from a correction algorithm of the cold temperature assistance system. In addition, the cold temperature assistance system could be used in conjunction with the steps of a procedure for any terminal area set of procedures application when there is a temperature requirement that requires cold temperature conditional restrictions.

The present disclosure describes a cold temperature assistance system that uses a set of methodology for receiving data of an actual aerodrome temperature via an APP configured for cold temperature assistance that consider all the inputs of data about the aircraft and the aerodrome to increase the accuracy of the data by an algorithmic solution about the surroundings based on a priority scheme that validates and receives the data as inputs in real time.

In various exemplary embodiments, the present disclosure describes the cold temperature assistance system verifications or checks for notices to airman (NOTAMs) and notices to airman publications (NTAP) for identifying conditions of a temperature restricted destination or airport; information provided by the aerodrome controllers about the cold temperature through RT; and temperature sensors for monitoring surrounding temperatures of the aircraft available for viewing in the cockpit of the aircraft.

In various exemplary embodiments, the present disclosure describes the corrected computed altitudes based on the received actual aerodrome cold temperature are published and the corrected altitudes for a particular segment and the amount of correction will be communicated to the aerodrome controllers through a datalink or any other aspects based on the pilot's acknowledgment. This aids the APP of the cold temperature assistance system to adhere to any standard operating procedure set by local authorities as well as aids the other aircrafts and controllers in the vicinity of the aerodrome.

In various exemplary embodiments, the present disclosure describes the APP configured by the cold temperature assistance system to generate alerts or issuing warnings to the flight crew (i.e. the pilot) when the corrections are applied to the air traffic controller (ATC) assigned altitudes or when flying on a flight path based on radar vectors in lieu of a flight path outlined by a published missed approach procedure. In addition, the APP is configured to issue a caution to the pilots when vectors to an intermediate segment are lower than the requested intermediate segment altitude corrected for temperature.

In various embodiments, the present disclosure describes a cold temperature assistance system that detects the temperature restriction at airport, calculates a cold temperature compensation based on the Notice to Airman/Notice to Airman Publication (NOTAM/NTAP) and communicates a set of compensation values to the ATC. For example, the present disclosure describes a process of a cold temperature assistance for checking for NOTAMs/NTAPs of temperature restricted airports, communicating information from the aerodrome controller about the cold temperature restrictions through radio contact (RT), and receiving real-time data of external temperatures in the vicinity of the aircraft from temperature sensors in the cockpit.

In various exemplary embodiments, apparatuses, and methods are provided to assist with publishing cold temperature restrictions at airports or aircraft crews flying to such restricted airport destinations, to report to aerodrome controllers cold temperature corrected altitudes for any intermediate segment, or the final altitude for a cold temperature published missed approach. For example, in such circumstance, standard operating procedure dictates that cold temperature corrected altitude reporting is required to go through radio contact (RT), with the ATC issuing approach clearance for the corrected altitude of an aircraft during an approach to the cold weather restricted destination airport. That is, the pilots must not apply cold temperature unilaterally without getting proper clearance from the aerodrome controllers. The pilot for safety must not apply cold temperature compensation to ATC assigned altitudes or when flying on radar vectors in lieu of a published missed approach procedure. The pilot should query ATC when vectors to an intermediate segment are lower than the requested intermediate segment altitude corrected for temperature. The pilot is encouraged to self-announce corrected altitude when flying into uncontrolled airfields.

In an exemplary embodiment, the HONEYWELL® GODIRECT™ Services can be configured to provide enhanced flight Optimizations and for presenting corrected altitudes to pilots on particular flight segments or when approaching airports with cold weather restrictions.

FIG. 1 illustrates a block diagram of the corrected computed altitudes based on the received actual aerodrome cold temperature 105. The pilot assistance algorithm 125 receives as inputs data from the aerodrome controller 110 through RT, the NOTAMs 115, and the ownship temperature sensor 120 and send, after processing, the data to the corrected altitudes 130 published in the app for the pilot when flying to the colder airports; communicates to the aerodrome controller 135 through appropriate means as required by the standard operating procedure; sends alerts 140 to the pilot when not to apply the altitude correction and cautions the pilot when vector 145 to an intermediate segment are lower than the requested intermediate segment altitude corrected for temperature. The corrected computed altitudes based on the received actual aerodrome cold temperature will be published.

That is, the corrected altitudes 130 for a particular segment and the amount of correction will be communicated to the aerodrome controllers through a datalink or any other communication coupling upon the pilot's acknowledgment. The assistance provided by the app 127 uses a pilot assistance algorithm 125 that adheres to the standard operating procedure set by the authorities. In addition the APP 127 can be configured as a mobile app on a mobile device in communication with aircraft systems. The APP 127 may also assist other aircraft and controllers in the vicinity of the aerodrome. The APP may automatically receive the data of the corrected altitude to calculate a cold temperature compensation based on data from published notices to airman (NOTAMs) by implementing the assistance algorithm 125 of the APP 127. The APP 127 ensures the appropriate alert or warning is issued to the pilots when the necessary corrections are applied to the ATC assigned altitudes or when adhering to a flight path on radar vectors in lieu of executing a flight path according to a missed approach procedure used or published. The APP 127 may also issue a caution (e.g. a notice not of sufficient urgency as is contemplated a warning notice) to the pilots when vectors at an intermediate segment are lower than the requested intermediate segment altitude corrected for temperature of the flight path.

Figure 2:
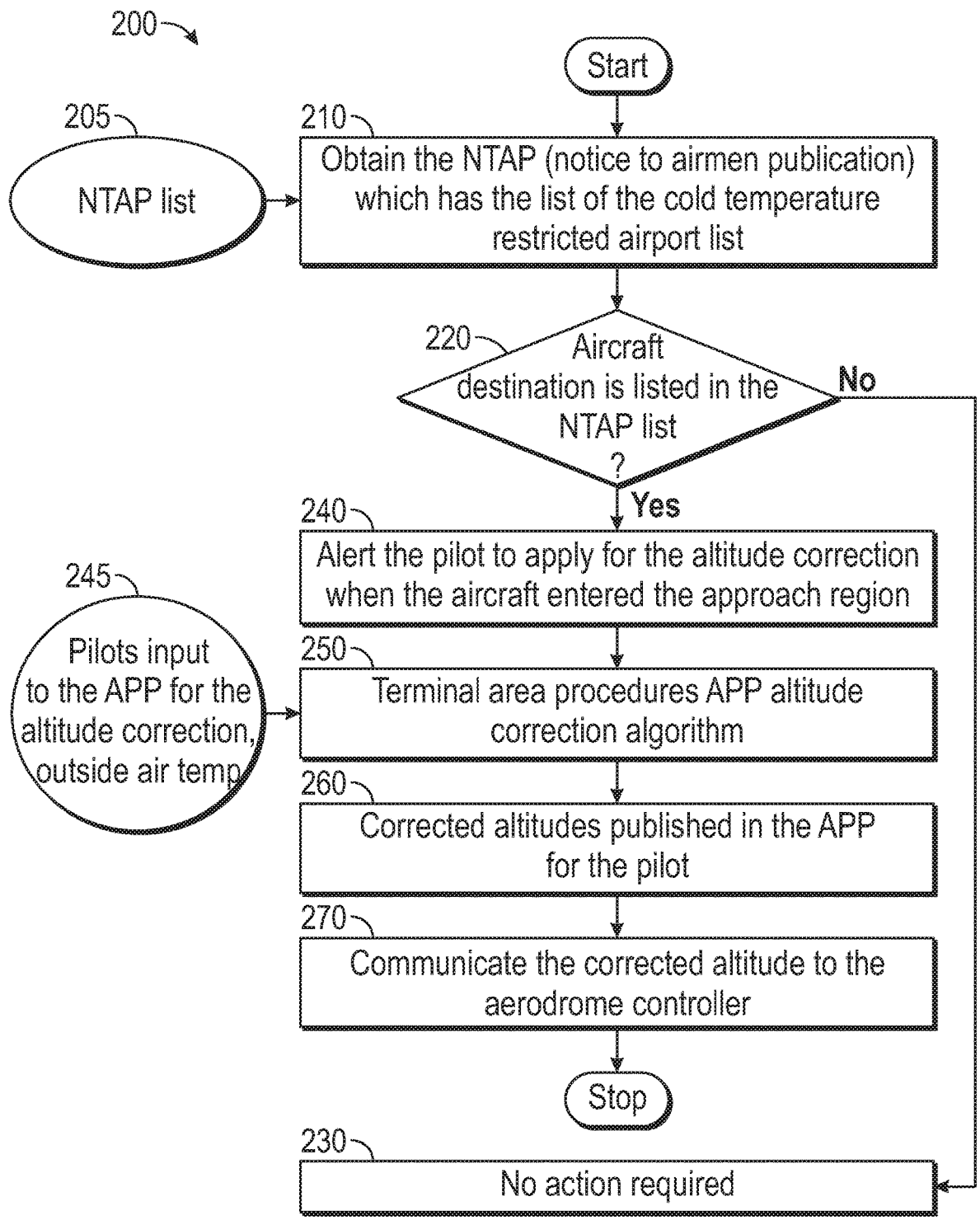
FIG. 2 illustrates a flowchart of implementing a cold temperature assistance system for flight crew assistance when approaching a restricted cold temperature airport in accordance with various exemplary embodiments.

FIG. 2 is a flowchart of a solution based on the notice to airmen publication (NTAP) in accordance with an embodiment. FIG. 2 describes obtaining the NTAP information, alerting the pilot, and correcting the altitudes and communicating the corrections of altitude to the aerodrome controller. In FIG. 2, task 210 obtains the NTAP which has the list 205 of the cold temperature restricted airports. Next, at task 220, the pilot assistance algorithmic solution determines whether the aircraft destination is listed in the NTAP list. If it is determined that the airport is not list, then at task 230 no further action is needed. If, on the other hand, the airport is listed, then the flow proceeds to task 240 where an alert is provided for the pilot to apply for an altitude correction when the aircraft on the flight path enters into an approach destination to the airport listed. At task 250, the terminal area procedures app altitude correction algorithm at task 250 receives the pilot input 245 for the altitude correction based on the outside air temperature. The corrected altitude is published in the app for the pilot at task 260. At task 270, the corrected altitude is communicated to the aerodrome controller.

In various exemplary embodiments, the app altitude correction algorithm at task 250 may use the formula (or a similar formula) of: $H_x$ $(15-t_0/273+t_0-0.5 \times L_0 \times (H+H_0))$ where: H=minimum height above the altimeter setting source (setting source is normally the aerodrome unless otherwise specified); $t_0 = t_{aerodrome} + L_0 \times h_{aerodrome}$ where the $t_{aerodrome}$ (or specified temperature reporting point) temperature is a temperature adjusted to sea level; $L_0 = 0.0065°$ C. per m or $0.00198°$ C. per ft.; $H_0$=altimeter setting source elevation; $t_{aerodrome}$=aerodrome (or specified temperature reporting point) temperature; $h_{aerodrome}$=aerodrome (or specified temperature reporting point) elevation. The calculated minimum safe altitudes/heights must be adjusted when the ambient temperature on the surface is much lower than that predicted by the standard atmosphere. In such conditions, an approximate correction is a 4% height increase for every 10° C. below a standard temperature as measured at the altimeter setting source; this change is deemed safe for all altimeter setting source altitudes for temperatures above −15° C.

Figure 3:
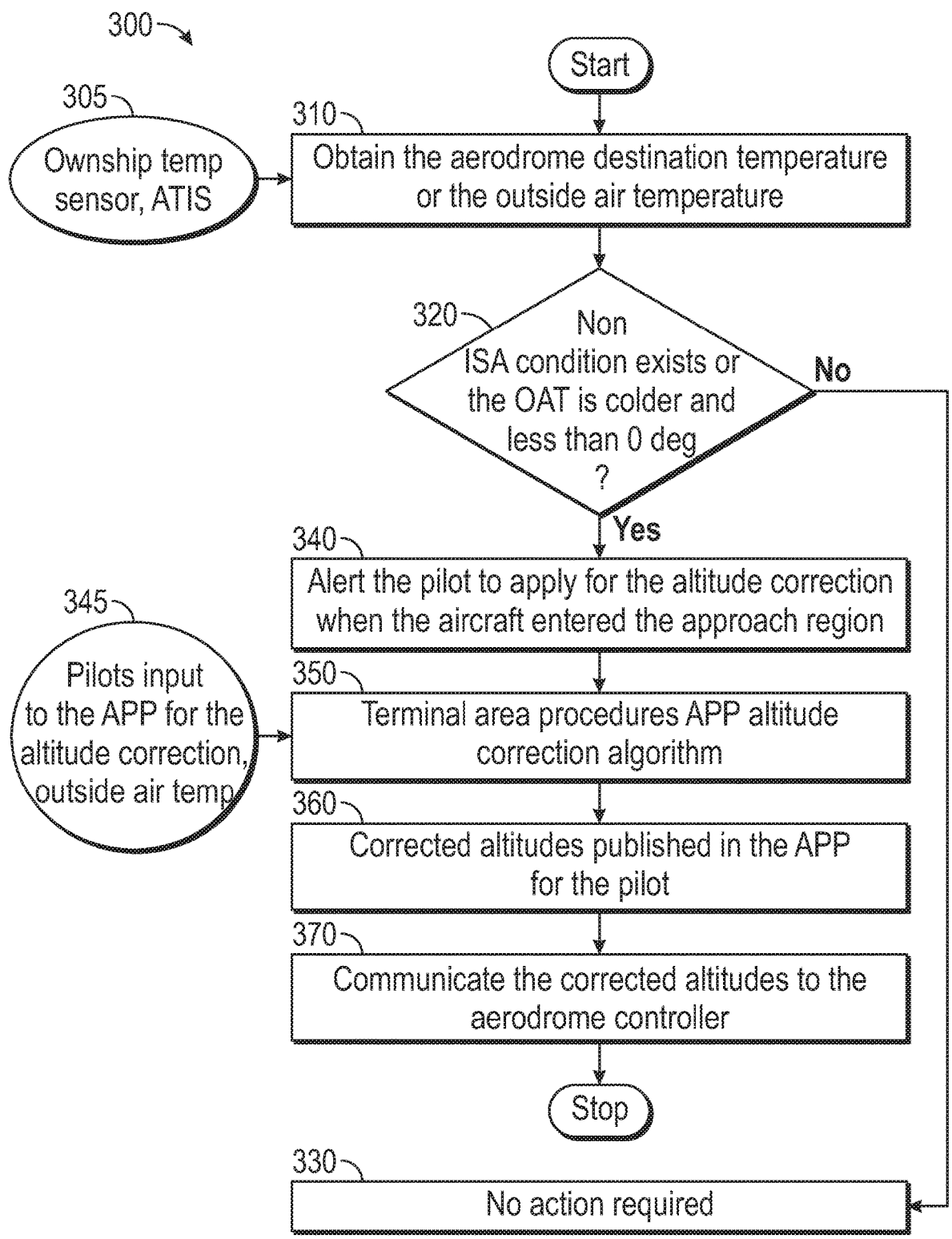
FIG. 3 illustrates a flowchart of implementing a cold temperature assistance system for flight crew assistance when approaching a restricted cold temperature airport in accordance with various exemplary embodiments.

FIG. 3 is a flowchart of a solution based on obtaining the aerodrome destination temperature or the outside air temperature by aircraft sensors or communications rather than obtaining such information (as in FIG. 2) based on the notice of publication to airman. At task 305, sensors of the aircraft sense the temperature or the temperature is derived from the automatic terminal information service (ATIS). The aircraft sensors generate temperature or receive ATIS recorded aeronautical information at task 305 which is in turn sent to the cold temperature assistance system. At task 310, the aerodrome destination temperature or the outside air temperature is obtained. At task 320, a determination is made as to whether a non ISA condition exists or the outside air temperature (OAT) is colder and less than zero degrees. If it is determined not to be the case, then the flow proceeds to task 330 and no action is required. If is it determine that either the condition exists or the OAT is colder and less than zero degrees, then at task 340 an alert is generated. At task 340, the alert is sent to the flight crew (i.e. the pilot) to apply for the altitude correction when the aircraft enters the approach region. Next, at task 350 with inputs from the pilot at task 345 to the APP for the altitude correction and outside air temperature; a terminal area procedure APP altitude correction algorithm at task 350 is executed. The corrected altitudes are published in the APP for the pilot at task 360. Then at task 370, the corrected altitudes are communicated to the aerodrome controller.

Figure 4:
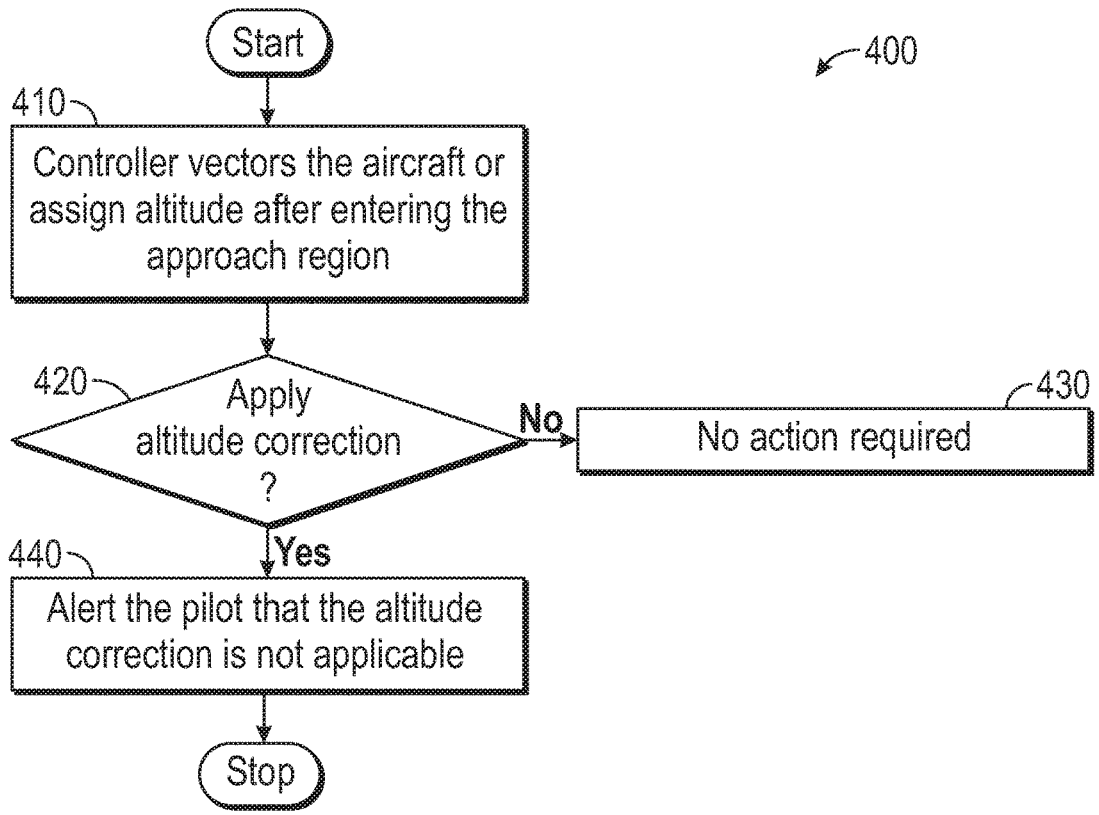
FIG. 4 illustrates a flowchart of implementing a cold temperature assistance system for flight crew assistance when approaching a restricted cold temperature airport in accordance with various exemplary embodiments.

FIG. 4 illustrates an exemplary flowchart 400 that alerts the flight crew when an altitude correction is executed on the air traffic controller (ATC) assigned altitude (ALT) in accordance with an embodiment. The controller vectors the aircraft or assigns an altitude after entering the approach region at task 410. Next, at task 420 the pilot determines whether to apply an altitude correction. If no correction is applied, then the flow proceeds to task 430 and no action is required. Alternately, if an apply altitude correction is decided as needed by the pilot, then at task 440, an alert is made that the altitude correction is not applicable because the controller has already made the vector change or the altitude has been assigned. In other words, the pilot is informed that the altitude correction is not applicable at this time to avoid any confusion.

Figure 5:
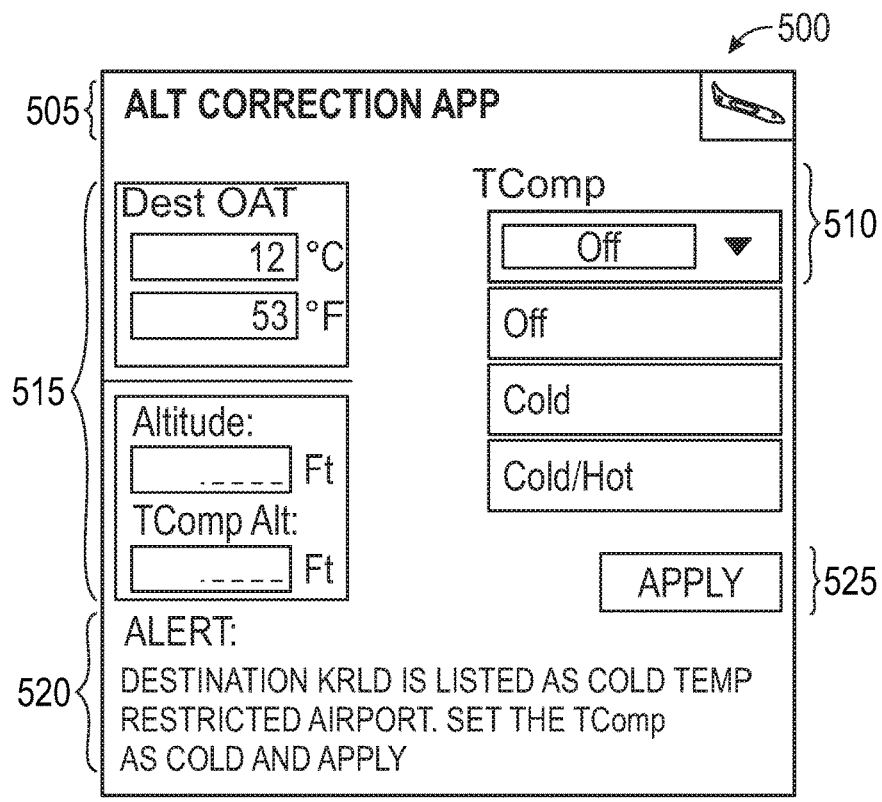
FIG. 5 illustrates a illustrates a snapshot of a display of an user interface of a cold temperature assistance system for flight crew assistance when approaching a restricted cold temperature airport in accordance with various exemplary embodiments.

FIG. 5 is an exemplary snapshot of a user interface 500 of the APP of the cold temperature assistance system in accordance with an embodiment. The user interface 500 displays the labeling "ALT CORRECTION APP" 505 with the fields 515 of the "Dest OAT", "Altitude:" and TComp Alt:" There is an indication of the status of the cold temperature assistance system at "TCOMP" is in an "Off" state and by a pull down menu 510, the states can be toggled to an "Off", "Cold" of "Cold/Hot" states. A touch selective button at 525 is configured to "APPLY" the particular state configuration selected by the pull down menu 510. An alert 520 is visually displayed to the user (i.e. the pilot), and in this particular exemplary embodiment displays the statement of the alert of the "DESTINATION KRLD IS LISTED AS COLD TEMP RESTRICTED AIRPORT. SET THE TComp as COLD AND APPLY". The alert is configured to instruct the pilot on the correct settings to set the APP because a condition of a cold restriction exists at the destination airport "KRLD".

Figure 6:
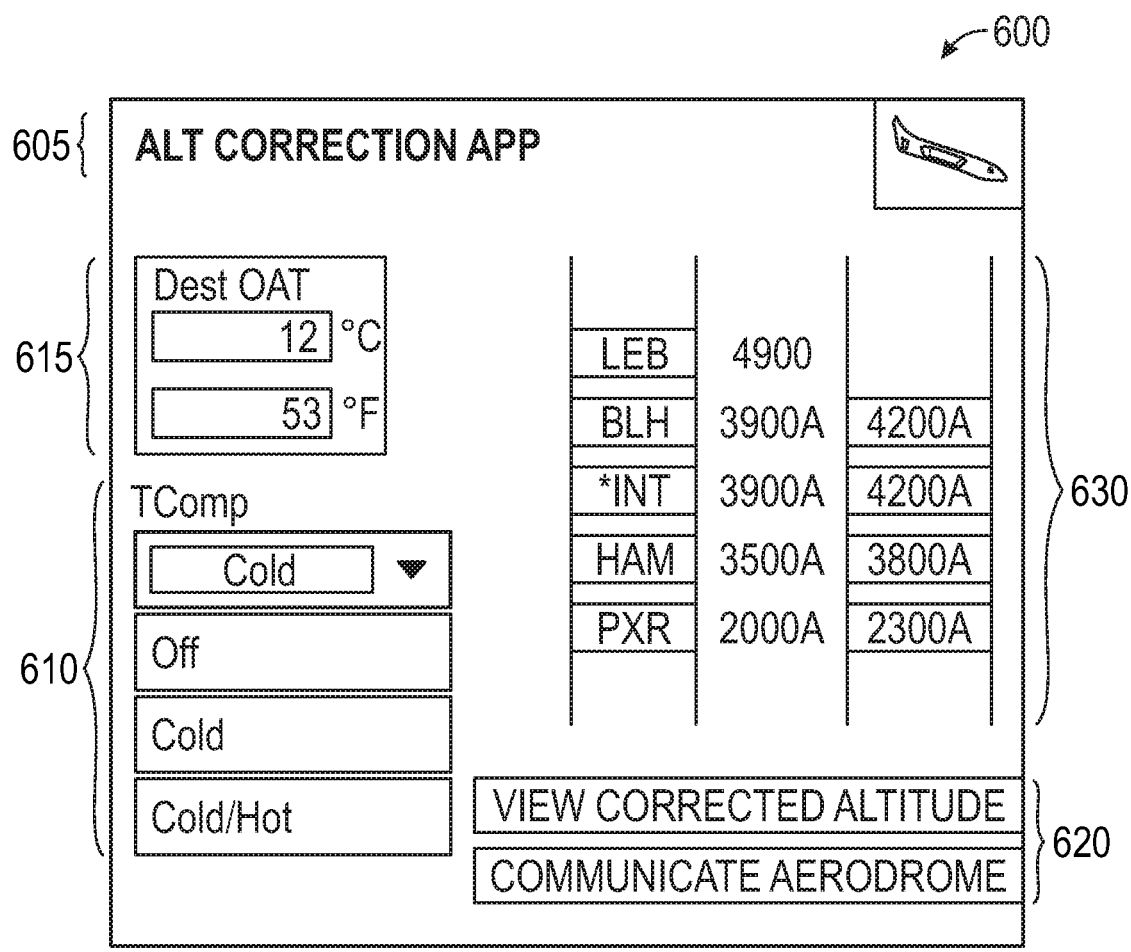
FIG. 6 illustrates a illustrates a snapshot of a display of an user interface of a cold temperature assistance system for flight crew assistance when approaching a restricted cold temperature airport in accordance with various exemplary embodiments.

FIG. 6 is an exemplary snapshot of a user interface 600 of the APP of the cold temperature assistance system in accordance with an embodiment. The user interface 600 displays the labeling "ALT CORRECTION APP" 605 with the fields 615 of the "Dest OAT" of "12 degrees Celsius" or "53 degree Fahrenheit". There is an indication of the status of the cold temperature assistance system at "TCOMP" is in a "COLD" state and by a pull down menu 610, the states can be toggled to an "Off", "Cold" of "Cold/Hot" states. The corrected altitudes are displayed at 630 and an alert at 620 indicates "VIEW CORRECTED ALTITUDE" and "COMMUNICATE AERODROME". The alert 620 instructs the pilot to view the corrected altitude to make the request the appropriate change in the vectoring or altitude change to the aircraft and to further communicate with the ATC about request to change based on the cold weather altitude restriction that is displayed for the particular destination.

FIGS. 7A and 7B illustrate exemplary tables 710, 720 of data values to be added by the pilot to the minimum promulgated height or altitude which can be as input data by the cold temperature assistance system in accordance with an embodiment.

The tables 710, 720 show exemplary requirements for temperature correction. For example, without referring to the tables, the calculated minimum safe altitudes/heights must be adjusted when the ambient temperature on the surface is much lower than that predicted by the standard atmosphere. In such conditions, an approximate correction as indicated earlier is 4 percent for a height increase associated with every 10° C. below the standard temperature as measured at the altimeter setting source. This is safe amount of height adjustment for all altimeter setting source altitudes for temperatures above −15° C.

The tables 710 and 720 illustrate more precisely the tabulated corrections. That is, for colder temperatures, a more accurate correction is obtained from the tables 710 and 720. As an exemplary example, the tables 710 and 720 are calculated for a sea level aerodrome and the tables 710 and 720 may be considered conservative when applied for higher aerodromes. To calculate the corrections for specific aerodromes or altimeter setting sources above sea level, or for values not tabulated. In addition, the corrections have been rounded up to the next 5 m. or 10 ft. increment. The temperature values from the reporting station (i.e the aerodromes) nearest to the position of the aircraft are used as the appropriate temperature values. The Corrections for specific conditions of the tables are calculated assuming a linear variation of temperature with height. For example, the calculations in particular instances, can be based on the following equation, with appropriate value of $t_0$, H, $L_0$ and $H_{ss}$ to calculate temperature corrections for specific conditions. The equation produces results that are within 5% of the accurate correction for altimeter setting sources up to 3000 m. (or 10,000 ft.) and with minimum heights up to 1500 m. (5000 ft.) above that source.

The equation used in the table is as follows: Correction=$H^*(15-t_0/273+t_0-0.5^*L_0^*(H+H_0))$ where: H=minimum height above the altimeter setting source (setting source is normally the aerodrome unless otherwise specified); $t_0=t_{aerodrome}+L_0 \times h_{aerodrome}$ of an aerodrome (or specified temperature reporting point) temperature adjusted to sea level $L_0$=0.0065° C. per meter or 0.00198° C. per ft.

Figure 8:
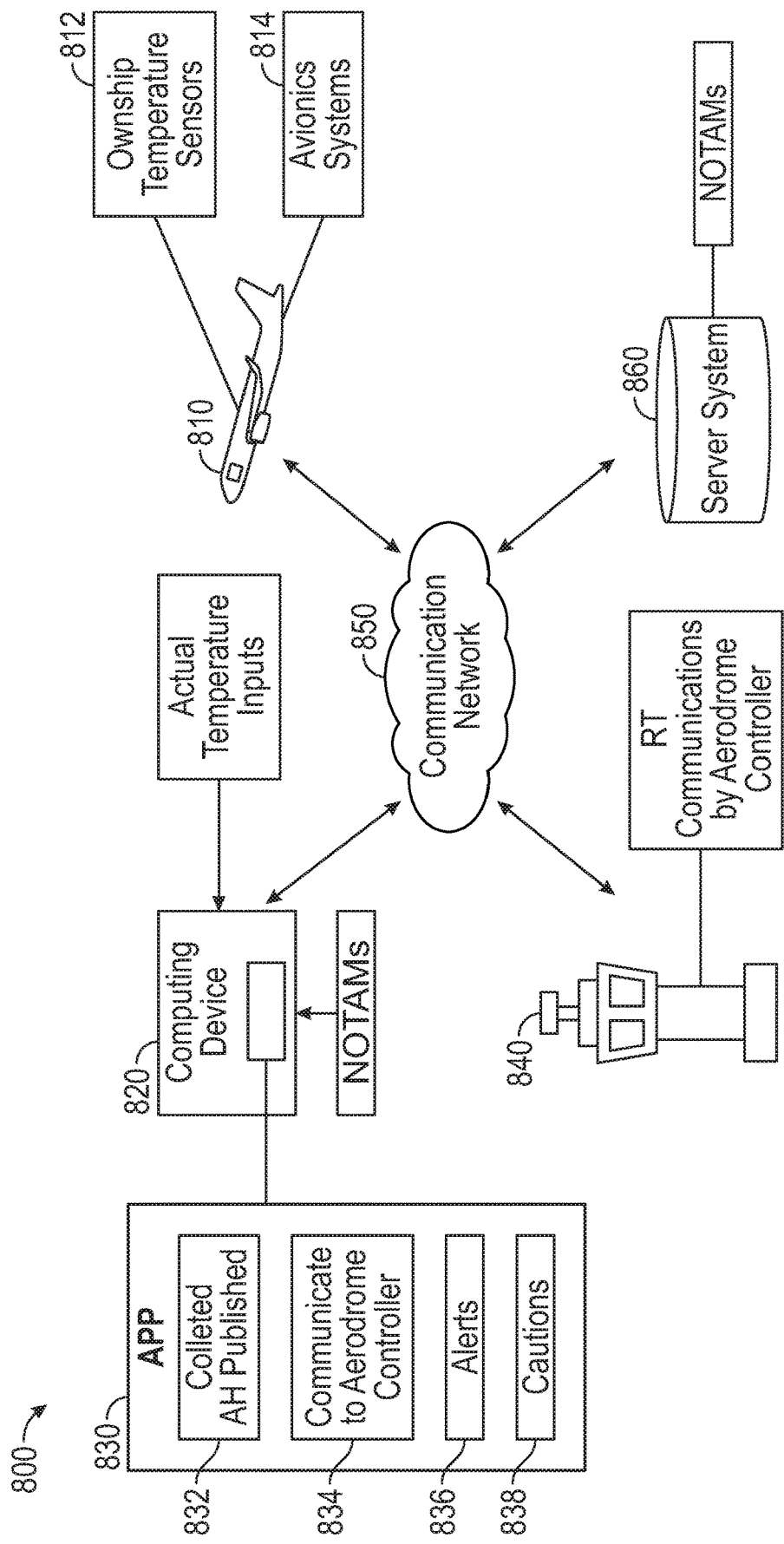
FIG. 8 is a diagram of a communication network of a system for the cold temperature assistance system in accordance with various exemplary embodiments.

FIG. 8 is a diagram of a communication network of a system for providing publication, communications, and sensed temperatures with a connected APP of the cold weather assistance system in accordance with various exemplary embodiments. In FIG. 8 the communication network 800 may include, without limitation, a computing device 820 configured with an APP 830 that includes: a module 832 for displaying the corrected altitude publication, a module 834 that communicates with one or more avionics systems onboard the aircraft 810 and to aerodrome controllers, a module 836 for displaying alerts, and a module 836 for displaying cautionary messages. The APP 830 resides on a client of the computing device 820 which receives inputs of publication data of NOTAMs/NTAPs, actual temperature inputs, and temperature data from ownship temperature sensors 812. The communication is via the a communication network cloud 850 coupled to at least one server system 860, air traffic control (ATC) 840, and the aircraft 810. In practice, certain embodiments of the system 800 may include additional or alternative elements and components, as desired for the particular application.

The computing device 820 may be implemented by any computing device that includes at least one processor, some form of memory hardware, a user interface, and communication hardware and may be separate or integrated in the aircraft 810. For example, the computing device 820 may be implemented using a personal computing device, such as a tablet computer, a laptop computer, a personal digital assistant (PDA), a smartphone, or the like. In other embodiments, the computing device 820 may be implemented or integrated into a computer system onboard the aircraft 810.

The aircraft 810 may be any aviation vehicle which approaches by flying into a cold weather restricted destination airport. The aircraft 810 may be implemented as an airplane, helicopter, spacecraft, hovercraft, or the like. The one or more avionics systems 810 may include a Flight Management System (FMS), crew alerting system (CAS) devices, Automatic Dependent Surveillance-Broadcast (ADS-B), Controller Pilot Data Link Communication (CPDLC), navigation devices, weather radar, aircraft traffic data, and the like. Data obtained from the one or more avionics systems 814 may include, without limitation: aircraft characteristics, performance tables, weather data, or the like.

The server system 860 may include any number of application servers, and each server may be implemented using any suitable computer. In some embodiments, the server system 860 includes one or more dedicated computers. In some embodiments, the server system 860 includes one or more computers carrying out other functionality in addition to server operations. The server system 860 may store and provide any type of data used to, for example proprietary algorithms and performance tables used in the approach of the aircraft.

Figure 9:
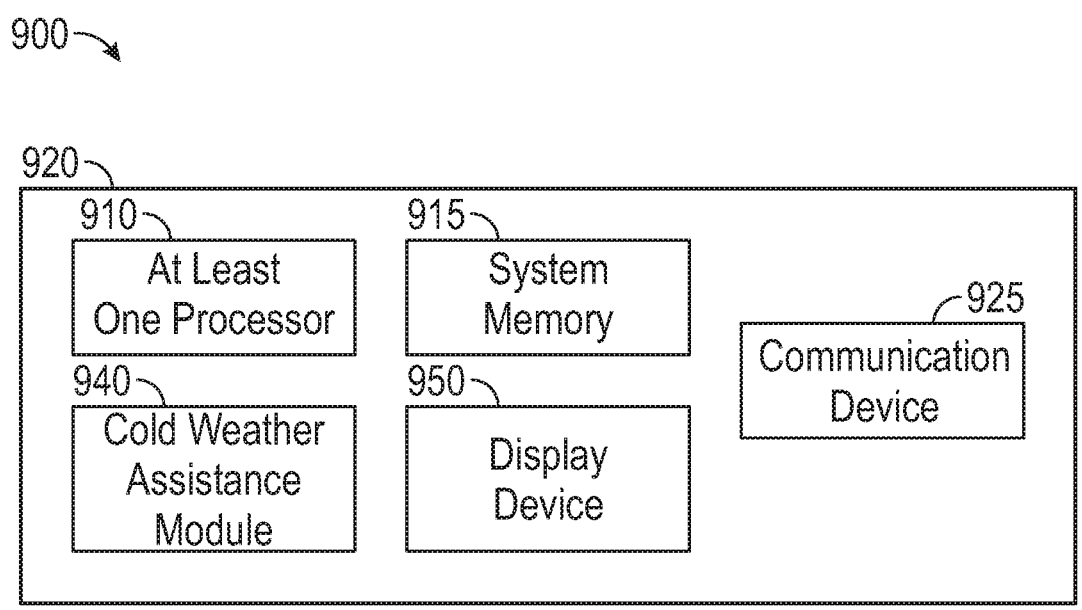
FIG. 9 is a block diagram of architecture of a system of the cold temperature assistance system in accordance with various exemplary embodiments.

FIG. 9 is a block diagram of architecture of a system 900 for providing cold weather assistance during an approach to a destination airport with restrictions for an aircraft in accordance with various exemplary embodiments. It should be noted that the computing device 920 can be implemented with the computing device 820 depicted in FIG. 8. In this regard, the computing device 920 shows certain elements and components of the computing device 820 in more detail.

The computing device 920 generally includes, without limitation: at least one processor 910; system memory 915; a communication device 925; a cold weather assistance module 940; and a display device 950. These elements and features of the computing device 920 may be operatively associated with one another, coupled to one another, or otherwise configured to cooperate with one another as needed to support the desired functionality—in particular, providing publication of NOTAM/NTAP data, communication to aircrafts and ATC, corrected altitudes for cold weather restricted destination airports, alerts to flight crews, and caution messages to flight crews as described herein. For ease of illustration and clarity, the various physical, electrical, and logical couplings and interconnections for these elements and features are not depicted in FIG. 9. Moreover, it should be appreciated that embodiments of the computing device 920 will include other elements, modules, and features that cooperate to support the desired functionality.

The at least one processor 910 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 910 may be realized as one or more microprocessors, controllers, microcontrollers, or state machines. Moreover, the at least one processor 910 may be implemented as a combination of computing devices, e.g., a combination of digital signal processors and microprocessors, a plurality of microprocessors, one or more microprocessors in conjunction with a digital signal processor core, or any other such configuration.

The at least one processor 910 is communicatively coupled to the system memory 915. The system memory 915 is configured to store any obtained or generated data associated with cold weather restricted airports during an approach by the aircraft. The system memory 915 may be realized using any number of devices, components, or modules, as appropriate to the embodiment. The communication device 925 is suitably configured to communicate data between the computing device 905 and one or more remote servers, one or more avionics systems onboard an aircraft, and air traffic control and/or ground control. The communication device 925 may transmit and receive communications over a wireless local area network (WLAN), the Internet, a satellite uplink/downlink, a cellular network, a broadband network, a wide area network, a radio communication network, or the like. The communication device 925 enables the sharing of a corrected altitude and/or other flight data to another aircraft or set of aircrafts in the vicinity.

The cold weather assistance module 940 is configured to publish corrected altitudes, communicate with the aerodrome controllers, issue alerts, send cautionary messages, and calculate by various algorithmic solutions the corrected altitudes of a cold temperature restricted destination airport. The display device 950 is configured to display various icons, text, and/or graphical elements for cold weather restrictions approaches and destination airports. In an exemplary embodiment, the display device 950 is communicatively coupled to the at least one processor 910. The at least one processor 910 and the display device 950 are cooperatively configured to display, render, or otherwise convey one or more graphical representations or images associated with the various approach flight steps, intermediate flight steps, and a published missed approach flight steps on the display device 950.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits.

It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An apparatus for assisting a pilot during an approach of an aircraft to an airport on approach, the airport having a cold temperature restriction, the apparatus comprising at least one processor deployed on a computing device, the at least one processor programmed to:
    receive data from published notices to airman (NOTAMs) about temperature restrictions of one or more airports;
    calculate a corrected cold temperature altitude for a particular segment when approaching the airport based on a cold temperature compensation;
    display, on the computing device of the aircraft, the corrected cold temperature compensation;
    communicate with an air traffic control for clearance for a corrected altitude for a flight segment on approach;
    receive one or more of: an outside air temperature (OAT) from a sensor system and temperature data from an automatic terminal information service (ATIS);
    detect whether: a non-international standard atmosphere (ISA) condition exists or the OAT is less than zero degrees, and
    when the corrected altitude for the flight segment on approach has been applied, and a current altitude correction based at least in part on the NOTAM data is determined to be no longer applicable:
        display, on the computing device of the aircraft, an alert to inform the pilot to not apply the corrected altitude during the approach to the airport; and
        display, on the computing device of the aircraft, a caution message to the pilot when vectors of a flight segment on approach are lower than a requested segment altitude corrected for temperature.

2. The apparatus of claim 1 further comprising:
    the at least one processor programmed to notify the pilot when vectors to an intermediate segment of a flight path are lower than a requested intermediate segment altitude as a result of a correction for a cold temperature.

3. The apparatus of claim 1, further comprising:
    the at least one processor programmed to alert the pilot in a user interface configured by an app on the computing device, in instances, when to apply the corrected altitude during the approach to the airport.

4. The apparatus of claim 1, wherein the at least one sensor system generates temperature data of temperatures about the aircraft during the approach for display.

5. The apparatus of claim 1, further comprising:
    the at least one processor programmed to communicate, by the pilot to the air traffic control, a corrected altitude for the particular flight segment on approach and an amount of correction necessary to achieve for the particular flight segment when approaching the airport with the cold temperature restriction.

6. The apparatus of claim 1, further comprising:
    the at least one processor programmed to identify by using an app on the computing device, whether the airport of a particular destination of a list of airports has a cold temperature restriction and display notice of the cold temperature restriction.

7. The apparatus of claim 1, further comprising:
    the at least one processor programmed to generate the caution message to the pilot when vectors to an intermediate segment are lower than a requested intermediate segment altitude corrected for temperature, and to display the caution message.

8. A method for assisting a pilot during an approach of an aircraft to an airport on approach, the airport having a cold temperature restriction, the method comprising:
    receiving data from published notices to airman (NOTAMs) about temperature restrictions of one or more airports;
    calculating a corrected cold temperature altitude for a particular segment when approaching the airport based on a cold temperature compensation;
    displaying, on a computing device of the aircraft, the corrected cold temperature compensation;
    communicating with an air traffic control for clearance for a corrected altitude for a flight segment on approach;

receiving one or more of: an outside air temperature (OAT) from a sensor system and temperature data from an automatic terminal information service (ATIS);

detecting whether: a non-international standard atmosphere (ISA) condition exists or the OAT is less than zero degrees, and when the corrected altitude for the flight segment on approach has been applied, and a current altitude correction based at least in part on the NOTAM data is determined to be no longer applicable:

displaying, on the computing device of the aircraft, an alert to inform the pilot to not apply the corrected altitude during the approach to the airport; and displaying, on the computing device of the aircraft, a caution message to the pilot when vectors of a flight segment on approach are lower than a requested segment altitude corrected for temperature.

9. The method of claim 8 further comprising:
notifying the pilot when vectors to an intermediate segment of a flight path are lower than a requested intermediate segment altitude as a result of a correction for a cold temperature.

10. The method of claim 8 further comprising:
alerting the pilot, in instances, when to apply the corrected altitude during the approach to the airport.

11. The method of claim 8, wherein the at least one sensor system generates temperature data of temperatures about the aircraft during the approach for display.

12. The method of claim 8, further comprising:
communicating, by the pilot, to the air traffic control, a corrected altitude for the particular flight segment on approach and an amount of correction necessary to achieve for the particular flight segment when approaching the airport with the cold temperature restriction.

13. The method of claim 8, further comprising:
sharing, by a communication device, the corrected altitude to another aircraft wherein the another aircraft is connected via a communication network enabled to share flight data.

14. The method of claim 8, further comprising:
generating caution message to the pilot when vectors to an intermediate segment are lower than a requested intermediate segment altitude corrected for temperature.

15. A non-transitory computer-readable medium having stored thereon instructions that, when executed by a processor, cause the processor to:

receive data from published notices to airman (NOTAMs) about temperature restrictions of one or more airports;

calculate a corrected cold temperature altitude for a particular segment when approaching an airport of the one or more airports based on a cold temperature compensation;

display, on a computing device of an aircraft, the corrected cold temperature compensation;

communicate with an air traffic control for clearance for a corrected altitude for a flight segment on approach;

receive temperature data from one or more temperature data sources;

detect whether one or more atmospheric conditions exist based at least in part on the received temperature data, and when the corrected altitude for the flight segment on approach has been applied, and a current altitude correction based at least in part on the NOTAM data is determined to be no longer applicable:

display, on the computing device of the aircraft, an alert to inform a pilot of the aircraft to not apply the corrected altitude during the flight segment on approach; and display, on the computing device of the aircraft, a caution message to the pilot when vectors of the flight segment on approach are lower than a requested segment altitude corrected for temperature.

16. The non-transitory computer-readable medium of claim 15 wherein the temperature data comprises one or more of an outside air temperature (OAT) from a sensor system and temperature data from an automatic terminal information service (ATIS).

17. The non-transitory computer-readable medium of claim 15 wherein the atmospheric conditions comprise one or more of an outside air temperature (OAT) lower than a determined value and a non-international standard atmosphere (ISA) condition exists.

18. The non-transitory computer-readable medium of claim 15, wherein the at least one sensor system generates temperature data of temperatures about the aircraft during the approach for display.

19. The non-transitory computer-readable medium of claim 15, wherein the instructions further include instructions which, when executed by the processor, cause the processor to:

communicate, by the pilot to the air traffic control, a corrected altitude for the particular flight segment on approach and an amount of correction needed for the particular flight segment when approaching the airport with the cold temperature restriction.

20. The non-transitory computer-readable medium of claim 15, wherein the instructions further include instruction which, when executed by the processor, cause the processor to:

Identify, whether the airport of a particular destination of a list of airports has a cold temperature restriction; and generate a caution message to the pilot when vectors to an intermediate segment are lower than a requested intermediate segment altitude corrected for temperature.

* * * * *